(12) United States Patent
Schultz et al.

(10) Patent No.: US 8,090,322 B2
(45) Date of Patent: Jan. 3, 2012

(54) EMERGENCY CALL FORKING AND NOTIFICATION

(75) Inventors: Paul T. Schultz, Colorado Springs, CO (US); Robert A. Sartini, Colorado Springs, CO (US); Martin W. McKee, Herndon, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 633 days.

(21) Appl. No.: 12/124,642

(22) Filed: May 21, 2008

(65) Prior Publication Data

US 2009/0291663 A1 Nov. 26, 2009

(51) Int. Cl.
*H04B 17/00* (2006.01)
*H04L 12/58* (2006.01)
*H04M 1/725* (2006.01)
*H04W 4/00* (2009.01)
*H04W 24/00* (2009.01)

(52) U.S. Cl. .................. 455/67.11; 455/412.1; 455/433; 455/456.1; 719/328; 379/142.1

(58) Field of Classification Search ............... 455/67.11, 455/412.1, 433, 456.1; 379/142.1; 719/328
See application file for complete search history.

(56) References Cited

U.S. PATENT DOCUMENTS

| | | | |
|---|---|---|---|
| 6,650,901 B1* | 11/2003 | Schuster et al. | 455/456.1 |
| 6,754,470 B2* | 6/2004 | Hendrickson et al. | 455/67.11 |
| 6,757,530 B2* | 6/2004 | Rouse et al. | 455/412.1 |
| 7,016,675 B1* | 3/2006 | Schuster et al. | 455/433 |
| 7,028,311 B2* | 4/2006 | Roach et al. | 719/328 |
| 7,139,374 B1* | 11/2006 | Scott et al. | 379/142.1 |

* cited by examiner

*Primary Examiner* — William D Cumming

(57) ABSTRACT

A system receives subscriber configuration information, for an emergency forking/notification service, that includes criteria for initiating the forking/notification service and contact information for a recipient of the forking/notification service. The system receives an emergency call from a calling device and route the emergency call to a public safety answering point (PSAP). The system identifies the emergency call as a candidate for the emergency forking/notification service based on information associated with the calling device and the criteria for initiating the forking/notification service, and automatically initiates a forking/notification session to notify the recipient that an emergency call has been initiated from the calling device.

19 Claims, 8 Drawing Sheets

EMERGENCY CALL FORKING AND NOTIFICATION

BACKGROUND INFORMATION

There are many situations where a party may wish to be informed of an emergency call, such as a 911 call, at the time the call is placed. Emergency calls are generally routed to a Public Safety Answering Point (PASP) at a location remote from a caller. Based on the caller's situation, the PASP may dispatch appropriate emergency response personnel. In many situations an emergency call does not provide timely notification of a caller's situation to other interested parties, such as family members, administrators, local security and/or local medical personnel. A separate notification, such as a call or sequence of calls, may be necessary to provide notification to these other interested parties. However, additional calls may not be possible in some cases due to an extended duration of the initial emergency call and/or other circumstances.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide a secure, authorized method for third parties to be automatically notified of and, optionally, allowed to listen to emergency system calls. Implementations described herein may also facilitate emergency call monitors to initiate separate supplementary sessions from an emergency call to, for example, guide emergency personnel to the specific emergency location, such as within a large campus or building. Third party notification recipients may be defined by, for example, a pre-registration process.

The term "emergency call" may be used to refer to a telephone call placed to a dedicated emergency telephone number or emergency service number, such as "911" (in the United States and Canada), "112" (in much of Europe), or other "universal" emergency telephone numbers in other regions. As used herein, the term "recipient" may be a subscriber of the emergency forking/notification service outside of the PSAP system who is given access to notification and/or forking of emergency calls. As used herein, the terms "caller," "calling party," and/or "user" may be used interchangeably. Also, the terms "caller," "recipient" "calling party," and/or "user" are intended to be broadly interpreted to include a user device and/or a user of a user device.

Figure 1:
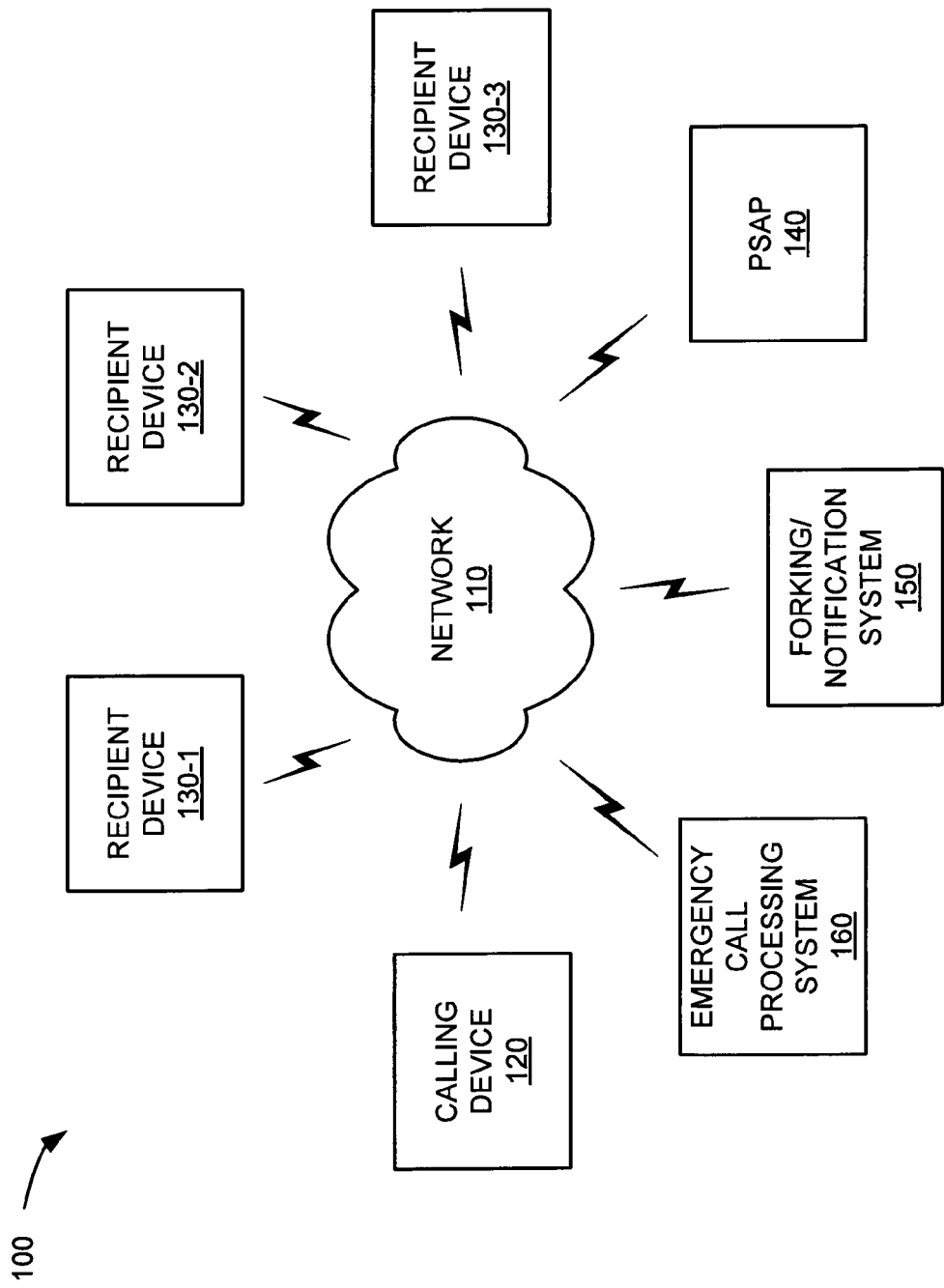
FIG. 1 depicts an exemplary network in which systems and methods described herein may be implemented.

FIG. 1 depicts an exemplary system 100 in which concepts described herein may be implemented. As illustrated, system 100 may include a calling device 120, one or more recipient devices 130-1 through 130-3 (collectively, recipient devices 130), a public safety answering point (PSAP) 140, an automated forking/notification system 150, and/or an emergency call processing system 160 interconnected by a network 110. Calling device 120, recipient devices 130, PSAP 140, forking/notification system 150 and/or emergency call processing system 160 may connect to network 110 via wired and/or wireless connections. One calling device, three recipient devices, one PSAP, one forking/notification system, one emergency call processing system, and one network have been illustrated in FIG. 1 for simplicity. In practice, there may be more or fewer calling devices, recipient devices, PSAPs, forking/notification systems, and/or networks. Also, in some instances, one or more of calling device 120, recipient devices 130, PSAP 140, forking/notification system 150, and/or emergency call processing system 160 may perform one or more functions described as being performed by another one or more of calling device 120, recipient devices 130, PSAP 140, forking/notification system 150, and/or emergency call processing system 160.

Network 110 may include a local area network (LAN), a wide area network (WAN), a metropolitan area network (MAN), an intranet, the Internet, a Public Land Mobile Network (PLMN), a telephone network, such as the Public Switched Telephone Network (PSTN) or a cellular telephone network (e.g., wireless GSM, wireless CDMA, etc.), any network supporting emergency call services (e.g., a VoIP network with mobile and/or fixed locations, a wireline network, etc.), or a combination of networks.

Calling device 120 and recipient devices 130 may include a Plain Old Telephone Service (POTS) telephone, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop, a personal computer, a VoIP-based device, or other types of computation or communication devices that can receive and/or initiate telephone calls. In one implementation, calling device 120 may include any device that is capable of initiating an emergency call. In another implementation, a recipient device 130 may be any device that can receive audio signals or text information regarding an emergency call. In yet another implementation, calling device 120 and/or recipient device 130 may be wired or wireless multimedia devices capable of sending and/or receiving audio, video, and text information.

PSAP 140 may include one or more entities that are responsible for answering emergency calls for emergency assistance from, e.g., police, fire, ambulance and/or other services. PSAP 140 may include one or more user devices, network devices, and/or other communication devices that service emergency calls. In one implementation, PSAP 140 may receive emergency calls from emergency call processing system 160 via Multi-Frequency (MF) trunks, digital trunks, ISDN User Part (ISUP) trunks controlled by the SS7 protocol, basic 911 trunks, E911 trunks, VoIP, Intranet, Internet, etc. In another implementation, PSAP 140 may communicate with emergency personnel (e.g., police, fire, and/or ambulance services) (not shown) to provide information associated with emergency calls.

Forking/notification system 150 may include one or more components to identify a location of calling device 120, notify one or more authorized recipients of the emergency call, and/or enable one or more authorized recipients to listen to the call between calling device 120 and PSAP 140. Additionally, forking/notification system 150 may establish one or more supplementary sessions to provide additional emergency response information relating to the original emergency call placed from calling device 120. As described in more detail herein, a supplementary session may include, for example, a query for additional information that may be relevant to an emergency call.

Emergency call processing system 160 may include a data transfer device, such as a gateway, a router, a switch, a firewall, a bridge, a proxy server, a server, a device providing domestic switching capabilities, or some other type of device that processes and/or transfers data. In one implementation, emergency services gateway may operate on data on behalf of a network (e.g., network 110) and may serve as an entrance to another network (e.g., an emergency services network of multiple PSAPs). Emergency call processing system 160 may route an emergency call from a calling device (e.g., calling device 120) to PSAP 140 and, in some implementations, to forking/notification system 150. Emergency call processing system 160 also may identify certain location or source information of the calling device that can be used by forking/notification system 150.

Figure 2:
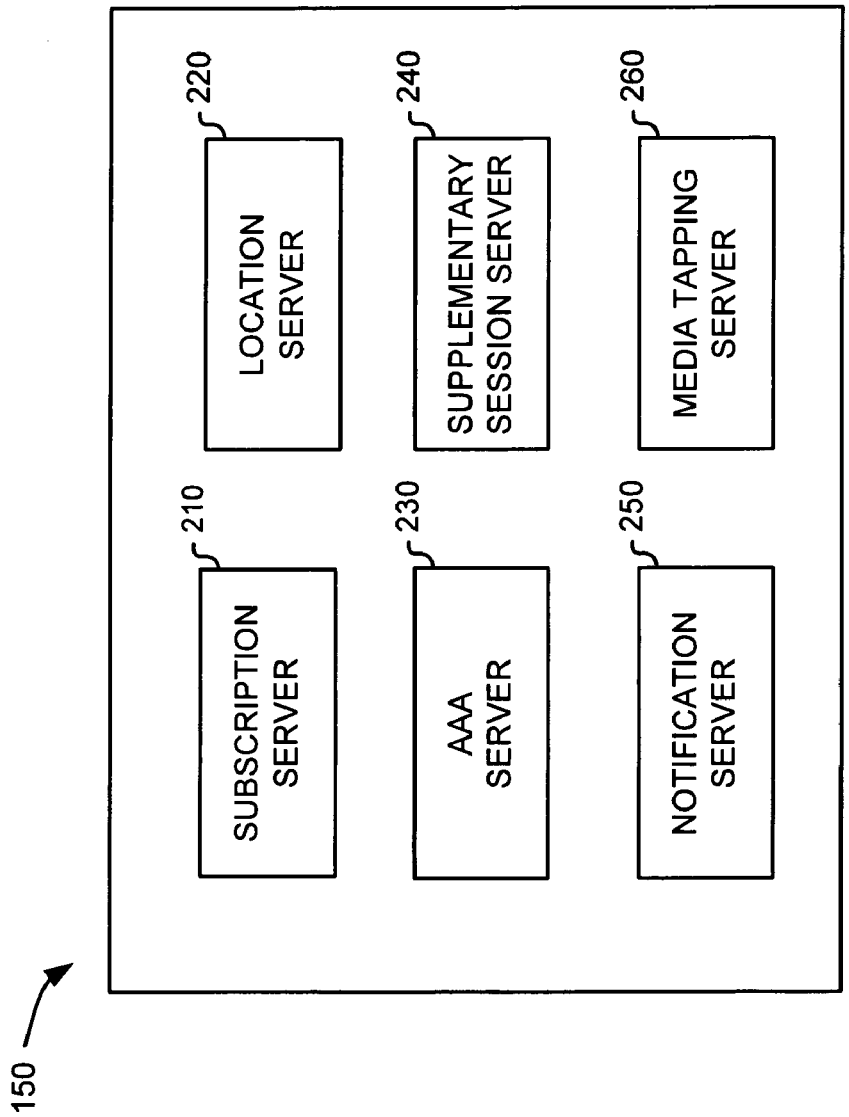
FIG. 2 is a diagram of exemplary components of the forking/notification system of FIG. 1.

FIG. 2 depicts exemplary components of forking/notification system 150. Forking/notification system 150 may include subscription server 210, location server 220, authentication, authorization, and accounting (AAA) server 230, supplementary session server 240, notification server 250, and/or media tapping server 260.

Subscription server 210 may identify caller subscriber groups and registered third-party recipients. For example, a caller subscriber group may include particular originating telephone numbers and/or locations of calling devices 120. In one implementation, a caller subscriber group may be a group of telephone extensions associated with a corporation or a campus. In another implementation, a caller subscriber group may be telephone numbers of particular family members. Any collection of callers/calling devices capable of being pre-selected may be defined as a caller subscriber group. Each caller subscriber group may be associated with one or more registered third-party recipients who may be notified of or granted listening access to emergency calls made by members within a caller subscriber group.

Subscription server 210 may also provide criteria and commands for each subscriber group. Subscriber group information may be stored in a memory of subscription server 210 or in a remote device, such a database, accessible by subscription server 210. Subscription server 210 may also include stored instructions for particular subscriber groups, including, for example, forking options, identification of particular entities (such as registered third-party recipients) to be notified, recording options, and rules for supplementary sessions. The stored instructions may be referred to herein as subscriber criteria or a "subscriber instruction script."

Location server 220 may collect and provide previously-stored and/or real-time (or near real-time) location information for calling device 120. In some implementations, location information may be, for example, global positioning system (GPS) information or another form of global navigation satellite system (GNSS) information collected from a mobile communications device. In other implementations, calling device location information may be in the form of cellular tower triangulation information collected from a mobile communications device. In still other implementations, calling device location information may be in the form of a fixed address or location associated with a wired telephone or other network connection. Calling device location information for fixed devices may be provided by subscribers, for example, at the time of registering for emergency forking/notification service. Location information for fixed devices may be stored in a memory of location server 220 or in a remote device, such a database, accessible by location server 220.

AAA server 230 may provide authentication, authorization, and accounting services. AAA server 230 may include scripts for authentication procedures and information for registered third-party recipients to ensure that notifications and/or listening access provided to registered third-party recipient devices are received only by the intended recipients. For example, AAA server may include pass codes, voice biometric data, or other user authentication information that can be provided by a registered third-party recipient at, for example, the time of registration. Use of the pass code, voice biometric data, or other user authentication may be required from a registered recipient before AAA server 230 can authorize release of an emergency call notification and/or media session access. AAA server 230 may also record information concerning how and when notification of and/or audio access to emergency calls was granted.

Supplementary session server 240 may initiate a variety of services to supplement information potentially relevant to the emergency call. For example, based on the location of the caller, supplementary session server 240 may query information regarding that particular location such as, for example, floor plans, surveillance cameras, building hours of operation, security protocols, building contents, etc. Information regarding a particular location may be accessed via a network or may be stored in memory related to supplementary session server 240. In one implementation, potentially relevant information may be collected as part of the subscription process and stored in a database.

Notification server 250 may provide an automated notification to one or more third parties that an emergency call was placed from a calling device within a particular subscriber group. Automated notification may be provided to the devices of parties in accordance with instructions (such as a subscriber instruction script) defined by a subscriber at, for example, the time of or after registering for emergency forking/notification service. Access to the automated notification on a registered device may be restricted to authorized users through an authentication process, such a password protection, voice recognition or other mechanisms. Notification may be in the form of an audible message recording, a text message, an email, short messaging service (SMS) message, multimedia messaging service (MMS), multimedia session, and/or another notification mechanism.

Media tapping server 260 may provide a one-way media session connection to allow an authorized party from a subscriber group to listen to an ongoing emergency call. Media tapping server 260 may communicate with one or more external network devices, such as a multiplexer, a router (e.g., a Layer 3 router), a switch (e.g., a Layer 2 switch), an optical cross connect (OCX), a hub, a bridge, a reconfigurable optical add and drop multiplexer (ROADM), a dense wavelength division multiplexer (DWDM) (e.g., a Layer 0 DWDM), a media server, or another type of computation or communication device capable of establishing a media session that allows one or more registered third-party recipients to "tap into" the emergency call. In one implementation, an authorized party may be provided with (e.g., from a notification from notification server 250) a number to call to listen to an ongoing emergency call. In another implementation, an automated call may be directed to one or more authorized parties with an audible prompt to enter a code to gain audible access to an ongoing emergency call. In another implementation, media tapping server 260 may provide authorized parties with access to listen and/or view video-enabled media sessions. Media tapping server may also include (or otherwise control) a recording device to record the audible (or viewable) conversation and data related to the tapped emergency call.

Although FIG. 2 shows exemplary components within forking/notification system 150, in other implementations, fewer or additional components that may be used. In other implementations, features of certain components may be combined. For example, in one implementation, one or more functions of notification server 250 and auto tapping server 260 may be combined. Conversely, a single component may be implemented as multiple, distributed components. For example, location server 220 may be a distributed component. Further, connections between the various components may be directly made or may be indirectly made via a node, a network, or a combination thereof.

Figure 3:
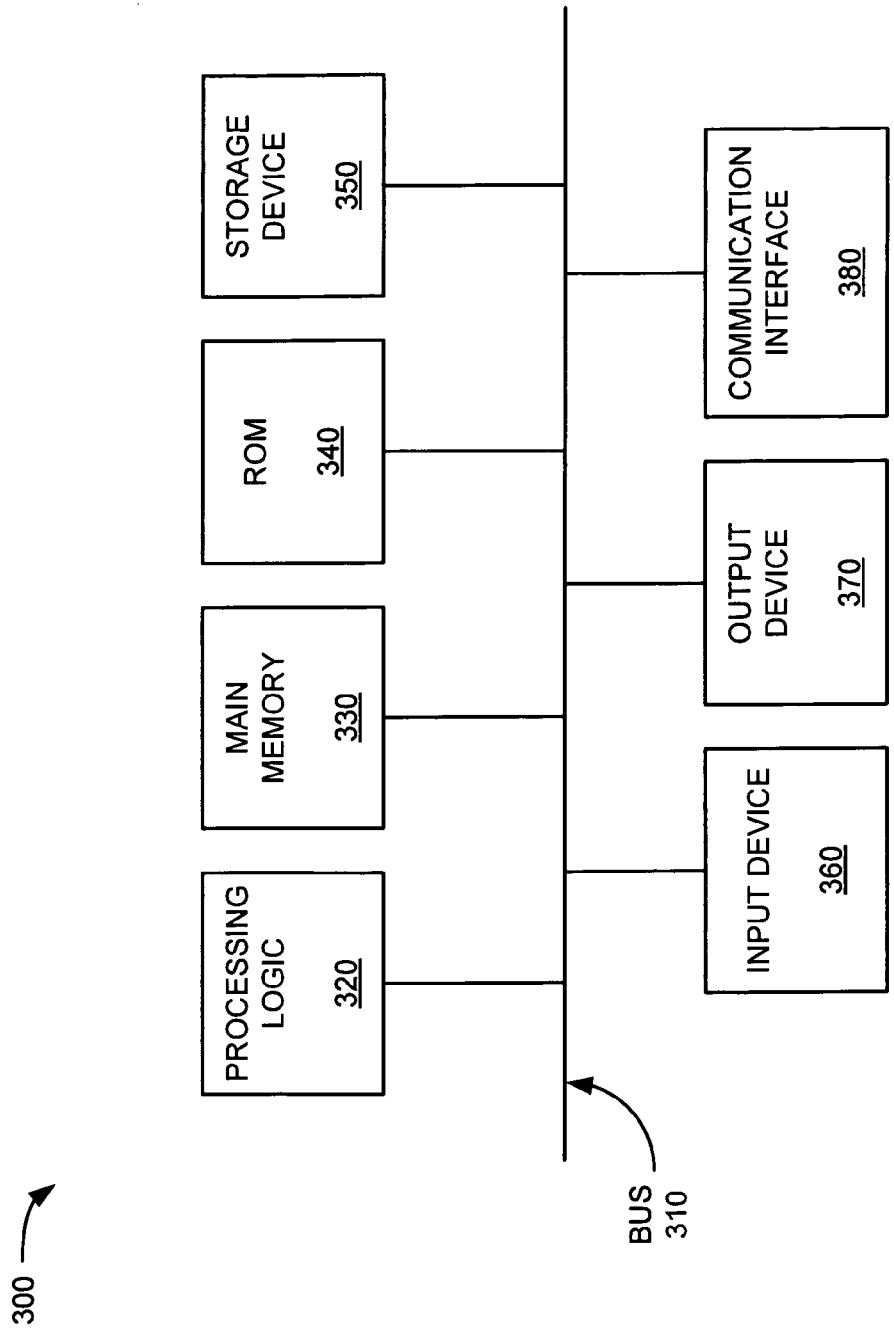
FIG. 3 is a diagram of an exemplary device that may be used in the systems of FIGS. 1 and 2.

FIG. 3 is an exemplary diagram of a device 300 that may correspond to any of calling device 120, recipient devices 130, subscription server 210, location server 220, AAA server 230, supplementary session server 240, notification server 250, and/or media tapping server 260. As illustrated, device 300 may include a bus 310, a processor 320, a main memory 330, a read only memory (ROM) 340, a storage device 350, an input device 360, an output device 370, and a communication interface 380. Bus 310 may include conductors or a pathway that permit communication among the components of device 300.

Processor 320 may include a processor(s), a microprocessor(s), or processing logic that interprets and executes instructions. Main memory 330 may include a random access memory (RAM) or another type of dynamic storage device that stores information and instructions for execution by processor 320. ROM 340 may include a ROM device or another type of static storage device that stores static information and instructions for use by processor 320. Storage device 350 may include a magnetic and/or optical recording medium and its corresponding drive.

Input device 360 may include one or more mechanisms that permit a user to input information to device 300, such as a keyboard, a touch screen, a touch pad, a mouse, a pen, voice recognition and/or biometric mechanisms, etc. Output device 370 may include one or more mechanisms that output information to the user, including a display, a printer, a speaker, etc. Communication interface 380 may include any transceiver-like mechanism that enables device 300 to communicate with other devices and/or systems. For example, communication interface 380 may include mechanisms for communicating with another device or system via a network, such as network 110.

Although FIG. 3 shows exemplary components of device 300, in other implementations, device 300 may contain fewer or additional components that may compliment and enable an emergency forking/notification service. In still other implementations, one or more components of device 300 may perform the tasks performed by other components of device 300.

Figure 4:
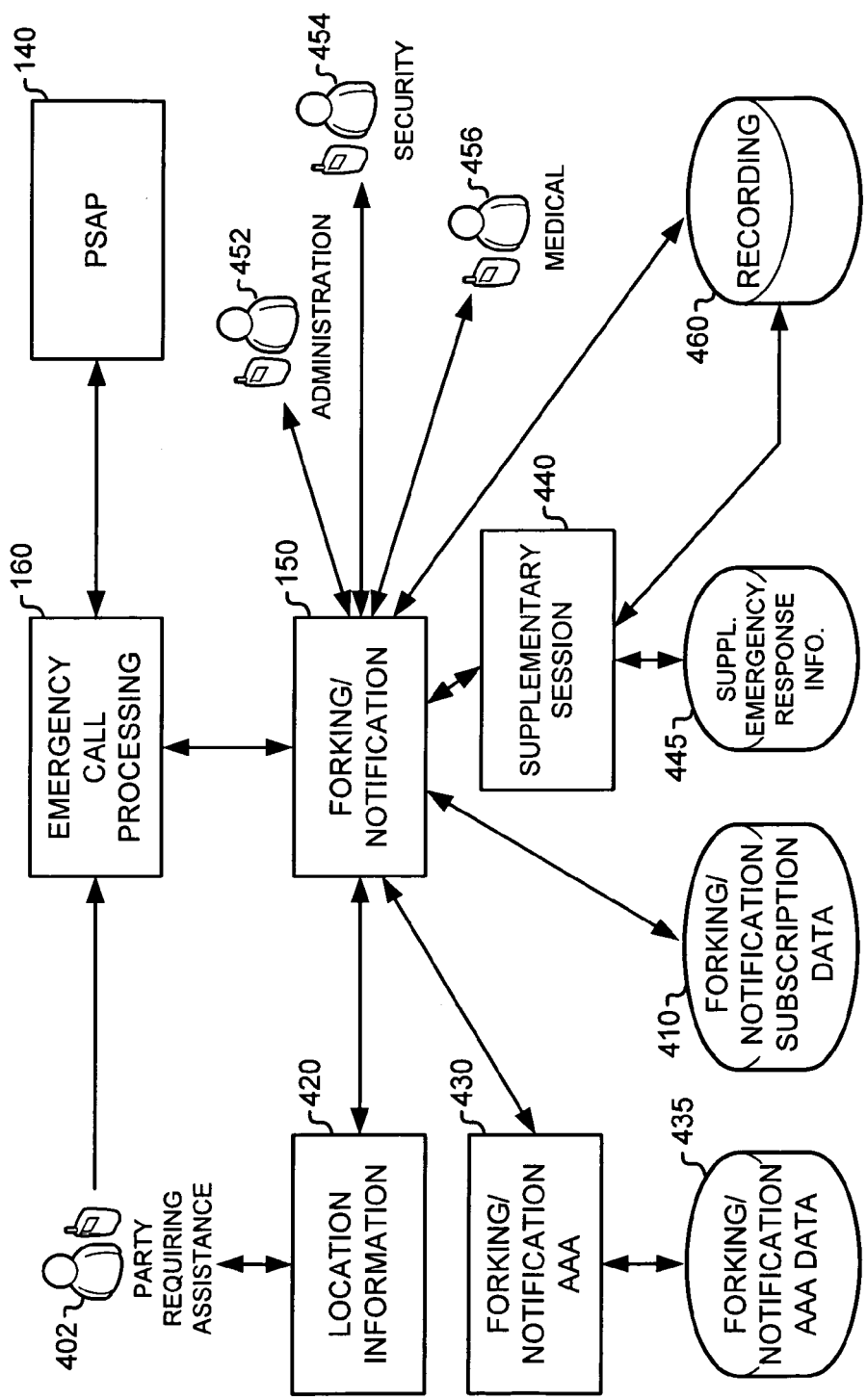
FIG. 4 is a functional diagram conceptually illustrating exemplary systems and methods described herein.

FIG. 4 is an exemplary functional diagram conceptually illustrating an implementation of the emergency forking/notification service. Party 402 requiring assistance may be a member of a subscription group for the emergency forking/notification service. Party 402 may place an emergency call (e.g., a "911" or "112" call) which is routed through emergency call processing system 160 to PSAP 140. Emergency call processing system 160 may also route the call to forking/notification system 150. Emergency call processing system 160 may identify certain general location or source information of the caller that triggers routing the call to forking/notification system 150. Location information may be real-time location information derived from, for example, a GPS system. Source information may be, for example, the recognition of a call originating from a private branch exchange (PBX) that serves a particular business or office. The call between party 402 and a representative at PSAP 140 may be conducted in a conventional manner and the simultaneous routing to forking/notification system 150 may be transparent to party 402 and/or PSAP 140.

When the call from party 402 is routed to forking/notification system 150, forking/notification system 150 may identify the telephone number of the originating device (e.g., by independent caller identification or by receiving caller identification information from emergency call processing system 160) and compare the telephone number against forking/notification subscription data 410 that may identify the calling device with a subscriber group of the emergency forking/notification service. Forking/notification subscription data 410 may also include a subscriber group instruction script that identifies instructions for callers within the subscriber group associated with the identified caller. If not provided from emergency call processing system 160, location information 420 may be provided directly to forking/notification system 150. Location information 420 may also be used to identify emergency callers within a specified area based on location. Location information 420 may be derived from information provided by a subscriber (for example, at the time of or after registration for the emergency forking/notification service) or gathered from a locating system in communication with the calling device of party 402 (for example, a GPS-enabled mobile phone).

Forking/notification authentication, authorization, and accounting (AAA) 430 may ensure only authorized users are recipients of either notification of or audio access to the emergency call placed by party 402. Forking/notification AAA 430 may have access to stored data, such as forking/notification AAA data 435, to manage access of third parties.

Supplementary session 440 may be used to provide additional emergency response information without interfering with the original 911 call between party 402 and PSAP 140. For example, supplementary session 440 may be used to gather information used to guide emergency responders to the specific emergency location of party 402 when the exact location might be confusing, such as a location on a large campus or in a large building. Supplementary emergency response information 445 may be used to facilitate collection of supplementary session 440. In some implementations, supplementary emergency response information 445 may include information, such as surveillance camera activation/locations, floor plans, building access routes, building access codes, etc. In one implementation, supplementary emergency response information may be made available directly to emergency personnel responding to the emergency call. In another implementation, supplementary emergency response information may be provided to a local point of contact (e.g., administrator 452 or security 454 near the location of the call) to be made available to emergency personnel upon their arrival on the scene.

In the example of FIG. 4, three authorized users may be registered to receive notification of the emergency call placed by party 402, particularly administration 452, security 454, and medical 456. Forking/notification system 150 may send an automated message to each of the authorized users 452, 454, and 456 indicating that an emergency call has been placed. Some or all of the authorized users 452, 454, and 456 may be given an option to listen to the ongoing or recorded emergency call. Some or all of the authorized users 452, 454, and 456 may be required to provide an appropriate pass code or voice command before being permitted to listen to the emergency call.

Forking/notification system 150 may also initiate recording 460 to record the originally-placed emergency call, record data from supplementary session 440, and record any notification and/or listening history. Thus forking/notification system 150 facilitates the ability to record the emergency call and other simultaneous/subsequent activities of forking/notification system 150. In certain implementations, data from recording 460 may include an information package assembled by supplementary session 440. In one implementation, data from recording 460 may be used during operations related to the emergency call to verify notification of relevant parties. In another implementation, data from recording 460 may be used to document a chronology of the emergency call process for post-event evaluation.

Figure 5:
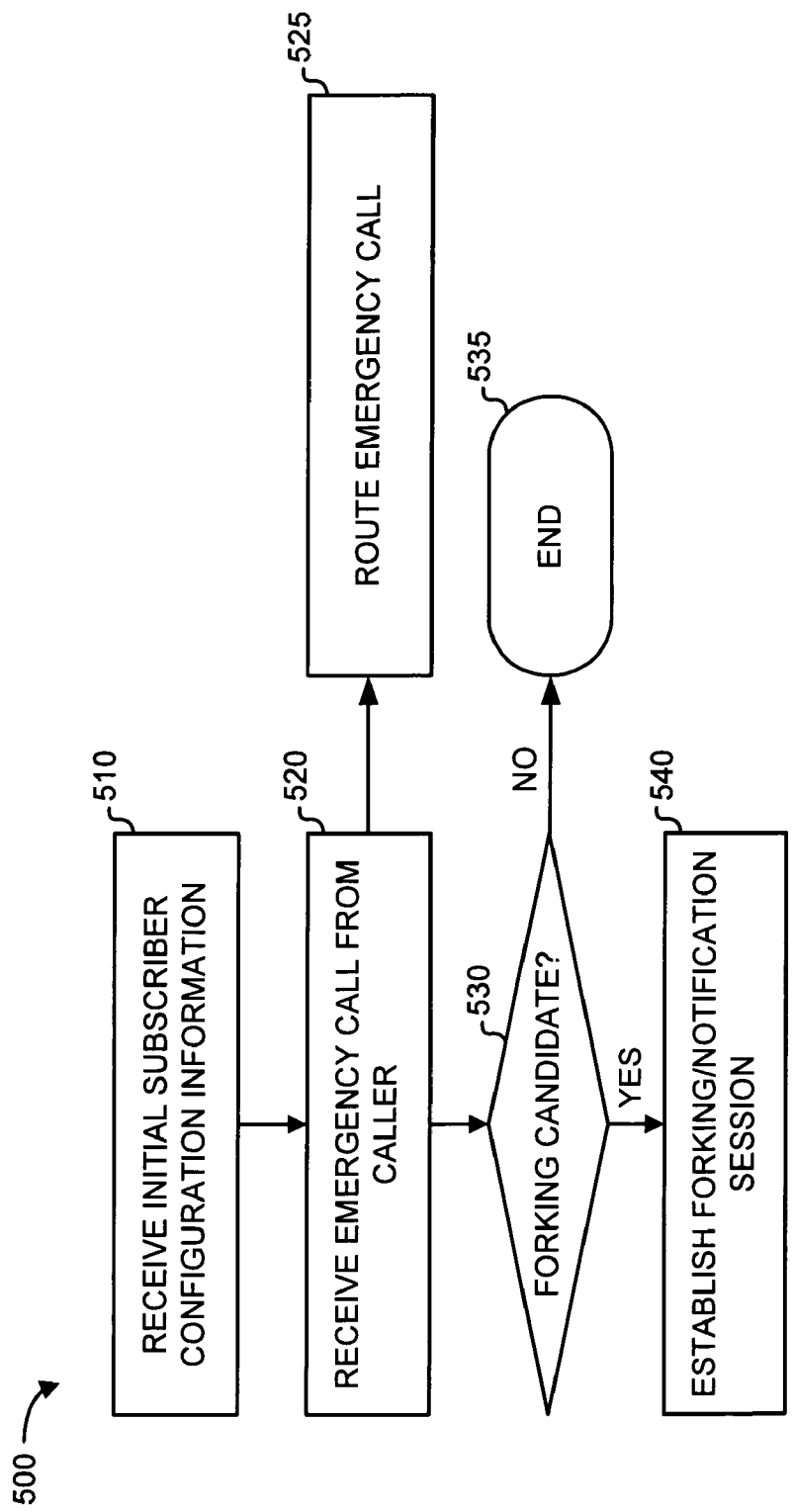
FIG. 5 is a flow chart illustrating exemplary operations that may be performed when an emergency call is placed in a system offering emergency forking/notification service.

FIG. 5 provides a flow chart 500 illustrating exemplary operations that may be performed when an emergency call is placed in a system offering the emergency forking/notification service. Initial subscriber configuration information may be received (block 510). For example, a subscriber may identify a particular group to whom the service will be applied, such as a list of family members' telephones or a PBX for a campus/office. The subscriber may also identify particular individuals (e.g., authorized recipients) who should be notified or given listening access in the event that an emergency call is placed by a calling device or member from within the subscriber group. The subscriber information may be stored in a memory for later access when an emergency call is received.

At some point, an emergency call from a caller may be received (block 520). For example, a caller may dial an emergency telephone number (e.g., "911") to report an emergency (e.g., a co-worker with an injury, a fire, etc.). Assume that the call is placed from a telephone associated with a PBX for an office building. The emergency call may be routed (block 525). For example, the call may be routed to the appropriate PSAP for the caller's region.

It may be determined whether the emergency call is a candidate for the forking/notification service (block 530). For example, in one implementation, the emergency call processing may query forking/notification system 150 to determine whether the number or location of the calling device is associated with a subscription group. In another implementation, the emergency call processing may have access to some or all of the forking/notification service subscription data sufficient to identify the caller as a subscriber. If the emergency call is not identified as a candidate for the forking/notification service, the forking/notification service may not be initiated (block 535). If the emergency call is identified as a candidate for the forking/notification service, a forking/notification session may be established (block 540).

Figure 6:
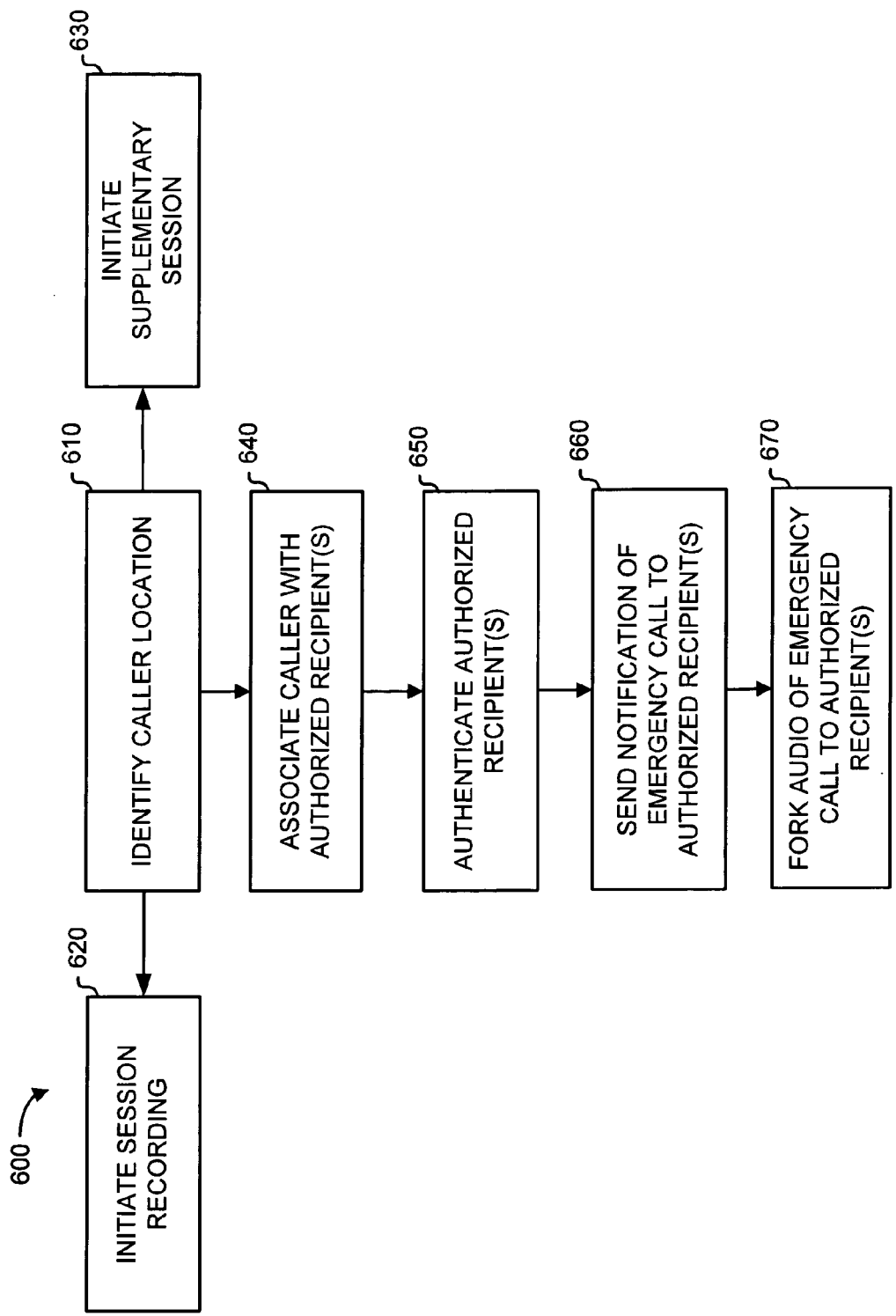
FIG. 6 is a flow chart illustrating exemplary operations that may be performed when implementing emergency forking/notification service.

FIG. 6 provides a flow chart 600 illustrating exemplary operations that may be performed when implementing the emergency forking/notification service. For example, referring to the exemplary configuration of FIG. 4, forking/notification system 150 may implement the exemplary operations after an emergency call is identified by emergency call processing system 160 as a candidate for the emergency forking/notification service.

Location information for the caller may be identified (block 610). Location information may be provided from one or more sources, including emergency call processing system 160 and/or location information 420. In some implementations, the location information identified for forking/notification system 150 in block 610 may be more precise than the location information used by emergency call processing system 160 to identify candidates for the forking/notification service. For example, in one implementation, location information may be GPS location information of the caller's GPS-enabled cell phone. In another implementation, a caller's telephone number may be identified and associated with a particular geographic location in a building or campus (e.g., a street address, a room number, a floor number, etc.). In another implementation, subscribers may register and update the location of certain telephone extensions in a building or campus (e.g., a particular room and/or a particular floor). In some implementations, caller location information may be used to confirm that a candidate for the emergency forking/notification service (as identified by the emergency call processing system 160) is an actual customer of the emergency forking/notification service.

A recording of the emergency call may be initiated (block 620). For example, forking/notification system 150 may initiate a recording session for the emergency call. The recording may include audio data, call routing information, and possibly other data related to the emergency call.

A supplementary session may be initiated (block 630). For example, forking/notification system 150 may initiate a supplementary session to provide additional emergency response information relevant to the emergency call without interfering with communications between a calling party and a PSAP. Additional details regarding initiation of a supplementary session are discussed with respect to FIG. 7.

Figure 7:
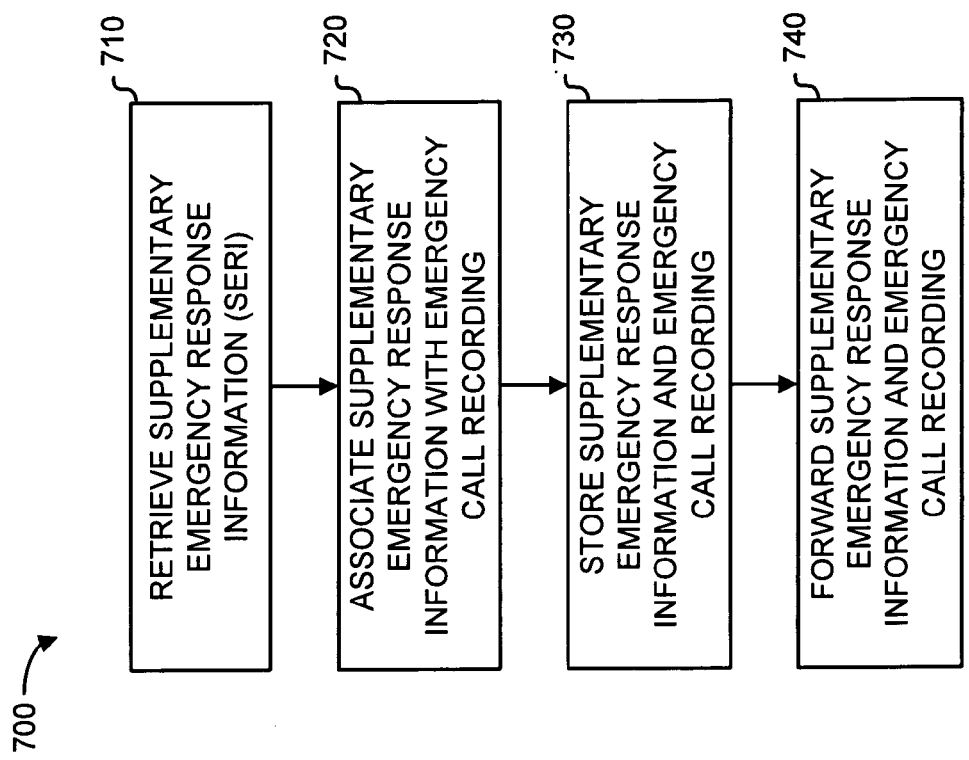
FIG. 7 is a flow chart illustrating exemplary operations that may be performed in establishing a supplementary session of an emergency forking/notification service.

FIG. 7 provides a flow chart illustrating exemplary operations that may be performed in establishing a supplementary session of an emergency forking/notification service. Supplementary emergency response information may be retrieved (block 710). For example, a supplementary session server (e.g., supplementary session server 240 of FIG. 2) may retrieve information from a database of supplementary emergency response information that is specific to the precise location or environment of the caller. In some implementations, supplementary emergency response information may include information such as location temperatures, surveillance camera activation/locations, floor plans, building and/or room access routes, building access codes, etc. In other implementations, supplementary emergency response information may include points of contact for a particular family or group associated with the caller. In still other implementations, supplementary emergency response information may include medical information for people associated with the calling device (such as allergies, diabetes, or other conditions) or the number and age of people associated with the calling device.

The supplementary emergency response information may be associated with the emergency call recording (block 720). For example, the supplementary session server may assemble a data file or group of files that include recorded data from the emergency call and supplementary emergency response information collected from a database of supplementary emergency response information.

The supplementary emergency response information and recorded emergency call data may be stored (block 730). For example, in one implementation, forking/notification system 150 may store the data compilation in a memory for access by authorized first responders and/or other emergency personnel (e.g., through a remote network connection). In another implementation, the stored data compilation may be accessible for post-emergency audits and/or other follow-up.

Optionally, the supplementary emergency response information and recorded emergency call data may be forwarded (block 740). For example, in one implementation, forking/notification system 150 may provide an electronic data package to a mobile computing device of authorized first responders and/or other emergency personnel as they are dispatched to the emergency location. In another implementation, forking/notification system 150 may provide the data package to a device of one or more points of contact at the emergency location, the particular points of contact having been identified at the time of (or after) a subscriber registering for the forking/notification service.

Referring back to flow chart 600 of FIG. 6, the caller may be associated with one or more authorized recipients (block 640). For example, each authorized recipient may have one or more individual telephone numbers, instant message address, Uniform Resource Identifier (URI), or other contact information that are associated with the emergency forking/notification service through a registration process. Authorized recipients may opt into the emergency forking/notification service by providing their telephone numbers, instant message address, or other contact information to the emergency forking/notification service provider. A data file including registered participant contact information may be stored in a memory (such as main memory 330 or storage device 350 of subscription server 210).

The authorized recipient(s) may be authenticated (block 650). For example, in one implementation forking/notification system 150 may provide a verification request to the telephone number of an authorized recipient. The verification request may include a request for the recipient to provide a pass code or voice command. In another implementation, an electronic message, such as a text message, an email, or a short messaging service (SMS) message may be provided to an authorized recipient's device to request a pass code or other type of authentication. In still another implementation, a telephone number of one or more recipient devices may be pre-authenticated so that anyone answering that recipient device may receive a notification.

A notification of the emergency call may be sent to the authorized recipient(s) (block 660). For example, after receiving a correct response to an authentication request, forking/notification system 150 may provide a notification of an emergency call to the authenticated device of a registered authorized recipient. The notification may include information about the originating telephone number and/or location of the emergency call. The notification may be provided in the form of, for example, a voice recording, a text message, an email, a short messaging service (SMS) message, multimedia message service (MMS), multimedia session, or another form of automated communication.

The audio of the emergency call may be forked to the authorized recipients(s) (block 670). For example, in addition to sending a notification to an authorized recipient, forking/notification system 150 may also provide an authorized recipient with the opportunity to "listen in" on an ongoing emergency call. In one implementation, audio access may be granted directly to the authorized recipient upon the forking/notification system 150 receiving authentication. In another implementation, an authorized recipient may be provided with a separate telephone number and/or pass code to access the ongoing emergency call. In one implementation, indication of which authorized recipient may be given access to an ongoing emergency call may be provided at the time of (or after) a subscriber registering for the emergency forking/notification service. Furthermore, in another implementation, advance authorization may be obtained from potential users (e.g., callers) of the forking/notification system 150 to alleviate privacy concerns.

Figure 8:
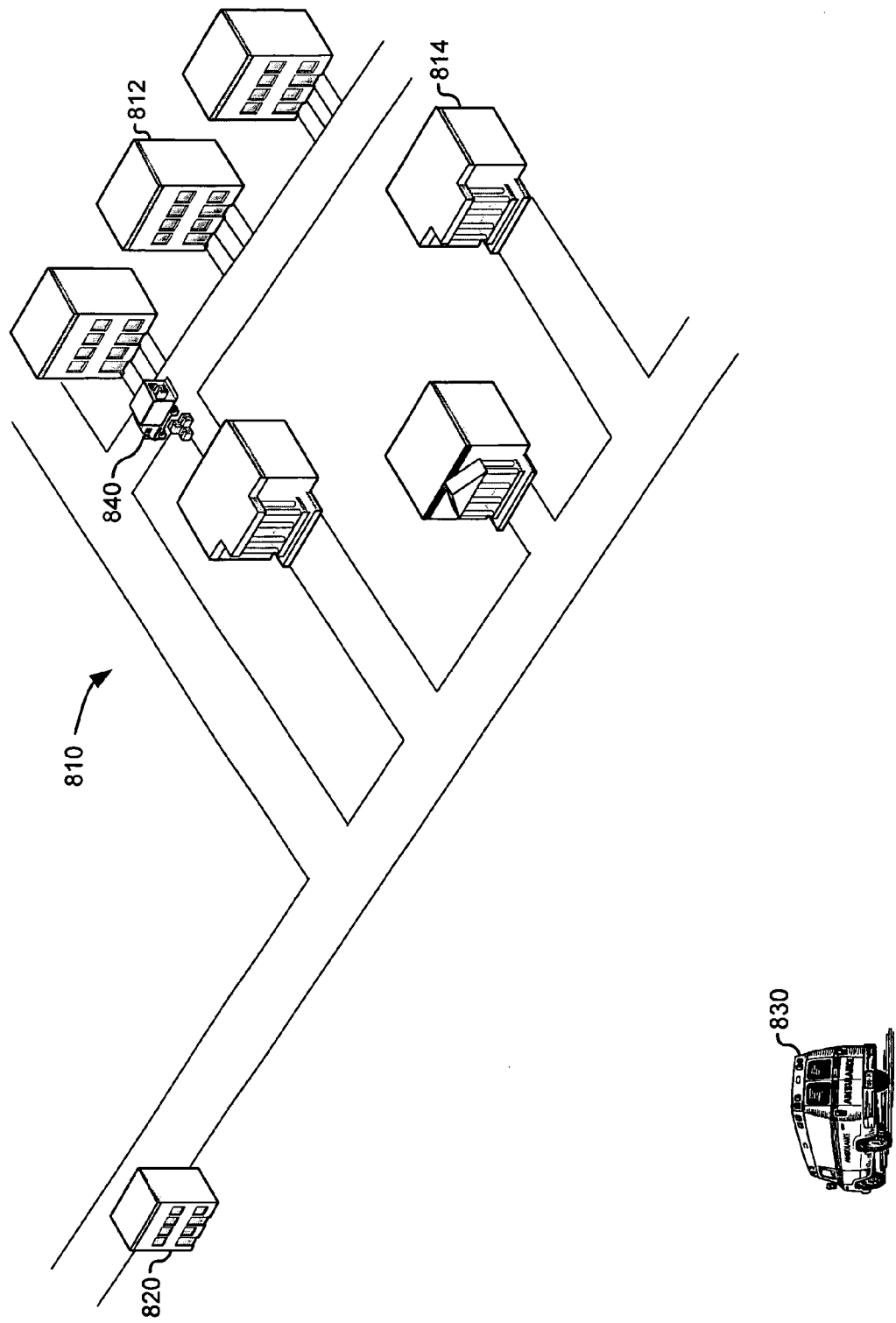
FIG. 8 is diagram illustrating an exemplary use of an emergency forking/notification service described herein.

FIG. 8 is a diagram illustrating an exemplary use for an emergency forking/notification service according to an exemplary implementation. In one implementation, an emergency forking/notification service may be effective for use in a campus environment. In the example of FIG. 8, college campus 810 may have registered all of its extensions associated with a PBX for the emergency forking/notification service. An emergency call is placed from within campus 810, and particularly, from the second floor of building 812. The emergency call is routed to a PSAP 820 at a remote location. Simultaneously, based on recognition of the PBX, the call is routed to the emergency forking/notification service. The emergency forking/notification service provides a notification of the call (after appropriate authentication) to a campus security officer and a nurse located in another building 814 of the campus 810.

Based on previous subscription information, both the security officer and the nurse are given access to listen in to the emergency call between the caller and the PSAP. Upon hearing that the emergency call relates to a medical emergency of a particular student, the nurse is able to pull the medical file for that student to check for any relevant medical history (e.g., allergies, blood pressure, etc.). Meanwhile, the security officer, upon hearing that an ambulance 830 has been dispatched to building 812 is able to observe that a delivery truck 840 is currently blocking the best access to building 812. Given the advance notice, the security officer is able to have the delivery truck 840 clear the way for the ambulance 830 to arrive at building 812.

The forking/notification system also initiates a supplementary session to retrieve data related to the emergency call. Particularly, the forking/notification system uses the caller's telephone extension to identify—in, for example, a database of supplementary emergency response information—the building 812 and the particular room from which the emergency call was placed. The supplementary session may then automatically retrieve a floor plan for the building 812 and identify access routes to the appropriate room. The floor plan may be automatically provided to a particular individual on the campus (e.g., the security officer or another administrator) via facsimile or another electronic transmission.

Upon arrival of the ambulance 830 to campus 810, the ambulance personnel are provided with a clear route to building 812 and the particular room of the emergency. They can be met by someone (e.g., the nurse) with a list or known allergies or other medical information of the student. The ambulance personnel may also be able to receive the floor plan of the building 812 to assess, for example, the best access for stretchers or other portable medical equipment.

Methods and systems described herein may provide the ability to "fork" emergency calls without interfering with conventional emergency call processing. Subscribed parties may be notified of emergency calls and be allowed to "listen in" to such calls. Users may be allowed to subscribe to emergency forking/notification services in advance. Methods and systems described herein may further provide the ability to secure who can be notified and who can "listen in" to emergency calls.

Methods and systems described herein may provide the capability of initiating separate sessions for providing supplementary emergency response information; the capability of identifying emergency callers within a specified area based on location; and the capability of recording emergency calls and supplementing the recording with person identification details, location information, and context information including (for example) surveillance video.

The foregoing description provides illustration and description, but is not intended to be exhaustive or to limit the embodiments to the precise form disclosed. Modifications and variations are possible in light of the above teachings or may be acquired from practice of systems and methods disclosed herein.

For example, in another implementation, an emergency forking/notification service may be included as a value-added service to, for example, a family's cell phone plan. A parent or other authorized guardian, for example, may be notified of emergency calls placed from a child's (or other family member's) cell phone and be provided with the opportunity to listen to the emergency call.

As another example, a school superintendent, security officer, and nurse may all subscribe to the emergency forking/notification service. When a teacher has an emergency in his classroom, he may dial "911." The emergency call may be routed to the Public Safety Answering Point (PSAP) and the emergency forking/notification service may "tap into" the emergency call and provide notifications. The superintendent may simply just receive the notification, while the security officer and nurse may both receive the notification and be able to listen in on the emergency call.

In still another example, a business, such as a manufacturing facility including chemical storage facilities, may subscribe to emergency forking/notification service according to systems and methods described herein. An emergency call reporting a fire may trigger a supplementary session to retrieve, among other information, information regarding the location of toxic or flammable chemicals in the building. This information may be used to help focus firefighting efforts.

Also, while series of blocks have been described with regard to the flowcharts of FIGS. 5-7, the order of the blocks may differ in other implementations. Further, non-dependent acts may be performed in parallel.

Implementations described herein may be implemented in methods and/or computer program products. Accordingly, implementations may be embodied in hardware and/or in software (including firmware, resident software, micro-code, etc.). Furthermore, implementations described herein may take the form of a computer program product on a computer-usable or computer-readable storage medium having computer-usable or computer-readable program code embodied in the medium for use by or in connection with an instruction execution system. The actual software code or specialized control hardware used to implement the systems and methods described herein is not limiting. Thus, the operation and behavior of the implementations were described without reference to the specific software code—it being understood that software and control hardware could be designed to achieve implementations based on the description herein.

Further, certain implementations described herein may be implemented as "logic" that performs one or more functions. This logic may include hardware, such as a processor, microprocessor, an application specific integrated circuit or a field programmable gate array; or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method performed by one or more computing devices, the method comprising:
    receiving, by one of the one or more computing devices, subscriber configuration information for an emergency forking/notification service, the subscriber configuration information including criteria for initiating the emergency forking/notification service and contact information for a recipient of the emergency forking/notification service;
    receiving, by one of the one or more computing devices, an emergency call from a calling device;
    routing, by one of the one or more computing devices, the emergency call to a public safety answering point (PSAP);
    identifying, by one of the one or more computing devices, the emergency call as a candidate for the emergency forking/notification service based on information associated with the calling device and the criteria for initiating the emergency forking/notification service; and
    automatically initiating, by one of the one or more computing devices, a forking/notification session to notify the recipient that the emergency call has been initiated from the calling device.

2. The method of claim 1, where the forking/notification session requests an authentication indication before notifying the recipient.

3. The method of claim 1, where automatically initiating the forking/notification session includes:
    sending an audible portion of the emergency call to the recipient to allow the recipient to listen to the emergency call between the calling device and the PSAP.

4. The method of claim 1, where automatically initiating the forking/notification session includes:
    identifying a location of the calling device.

5. The method of claim 4, where the forking/notification session initiates a supplementary session to query for additional information based on the location of the calling device.

6. The method of claim 1, where the forking/notification session automatically records voice data and session information for the emergency call between the calling device and the PSAP.

7. The method of claim 6, further comprising:
    receiving supplementary emergency response information relevant to a location associated with a calling device; and
    associating the supplementary emergency response information with the recorded voice data and session information for the emergency call.

8. The method of claim 1, where the criteria for initiating the forking/notification service includes one or more of a location of the calling device or a telephone number of the calling device.

9. A system, comprising:
a first non-transitory device to store subscriber criteria for initiating a service and contact information for one or more authorized recipients of the service;
a second device to receive an indication of an emergency call being placed by a calling device over a network; and
a notification server to:
automatically select an authorized recipient, of the one or more authorized recipients being based on the subscriber criteria, and
notify the selected authorized recipient that the emergency call has been initiated from the calling device.

10. The system of claim 9, where the notification server queries a device associated with the selected authorized recipient for an authentication indication before notifying the selected recipient.

11. The system of claim 9, further comprising:
a media tapping server to:
send an audio signal associated with the emergency call to the at least one or more authorized recipients to enable the at least one of the one or more authorized recipients to listen to the emergency call.

12. The system of claim 9, further comprising:
a location server to:
identify a location of the calling device.

13. The system of claim 12, further comprising:
a supplementary session server to:
initiate a query for additional information based on the location of the calling device.

14. The system of claim 9, further comprising:
a recording device to:
record an audible conversation and data related to the emergency call.

15. The system of claim 14, where the system receives information from a supplementary server, the information being relevant to a location associated with the calling device, and associates the received information with the recorded emergency call.

16. The system of claim 9, where the subscriber criteria includes one or more of a location of the calling device or an assigned telephone number of the calling device.

17. A non-transitory computer-readable memory comprising instructions executable by a processor, the non-transitory computer-readable memory comprising:
one or more instructions that, when executed by the processor, cause the processor to:
store subscriber criteria to notify a recipient, where the recipient is notified of an emergency call;
receive an indication of an emergency call being initiated from a calling device;
compare information associated with the calling device with the subscriber criteria; and
notify the recipient that the emergency call has been initiated from the calling device when the information about the calling device matches the subscriber criteria.

18. The non-transitory computer-readable memory of claim 17, where the subscriber criteria includes at least one of a location or an assigned telephone number of the calling device.

19. A method performed by a device, the method comprising:
storing, by the non-transitory device, subscriber criteria to notify a recipient, where the recipient is notified of an emergency call, and
where the subscriber criteria includes an originating location of the emergency call;
receiving, by the non-transitory device, an indication of a particular emergency call placed from a calling device;
comparing, by the non-transitory device, a location of the calling device with the subscriber criteria; and
automatically notifying, by the non-transitory device, the recipient that the particular emergency call has been initiated from the calling device when the location of the calling device matches the subscriber criteria.

* * * * *